US 8,260,083 B2

(12) United States Patent
Lee et al.

(10) Patent No.: US 8,260,083 B2
(45) Date of Patent: Sep. 4, 2012

(54) IMAGE PROCESSING METHOD AND APPARATUS, AND DIGITAL PHOTOGRAPHING APPARATUS USING THE SAME

(75) Inventors: Seung-yun Lee, Suwon-si (KR); Seok-goun Lee, Suwon-si (KR); Inh-seok Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 656 days.

(21) Appl. No.: 12/500,808

(22) Filed: Jul. 10, 2009

(65) Prior Publication Data
US 2010/0021064 A1    Jan. 28, 2010

(30) Foreign Application Priority Data
Jul. 23, 2008    (KR) .................. 10-2008-0071892

(51) Int. Cl.
*G06K 9/20*    (2006.01)

(52) U.S. Cl. ...................................... 382/282

(58) Field of Classification Search .................. 345/591, 345/604; 382/165, 181, 190, 264, 282; 706/20
See application file for complete search history.

(56) References Cited

U.S. PATENT DOCUMENTS
2008/0212894 A1*    9/2008    Demirli et al. ................ 382/276

FOREIGN PATENT DOCUMENTS
JP    2007-257165 A    10/2007
JP    2009-086705 A    4/2009
WO    WO 03/049035 A2    6/2003

OTHER PUBLICATIONS
Search Report established for GB0912583.2.

* cited by examiner

*Primary Examiner* — Gregory F Cunningham
(74) *Attorney, Agent, or Firm* — Drinker Biddle & Reath LLP

(57) ABSTRACT

An image processing method is provided. The method includes detecting a predetermined face area from an input image; converting the input image into Lab coordinates; determining whether coordinate areas having angles corresponding to an angle of the detected face area exist on a Lab color system and searching the input image for the coordinate areas according to a result of the determining; and blurring the detected face area and the found coordinate areas. An image processing apparatus and digital photographing apparatus using the method and apparatus are also provided. Accordingly, reduction of the resolution of a whole image may be prevented by processing only a face area, instead of the whole image, to result in a soft face area image quality. A deterioration in quality of portions which are not supposed to be blurred may be prevented by blurring only a skin color area of the face area.

16 Claims, 5 Drawing Sheets

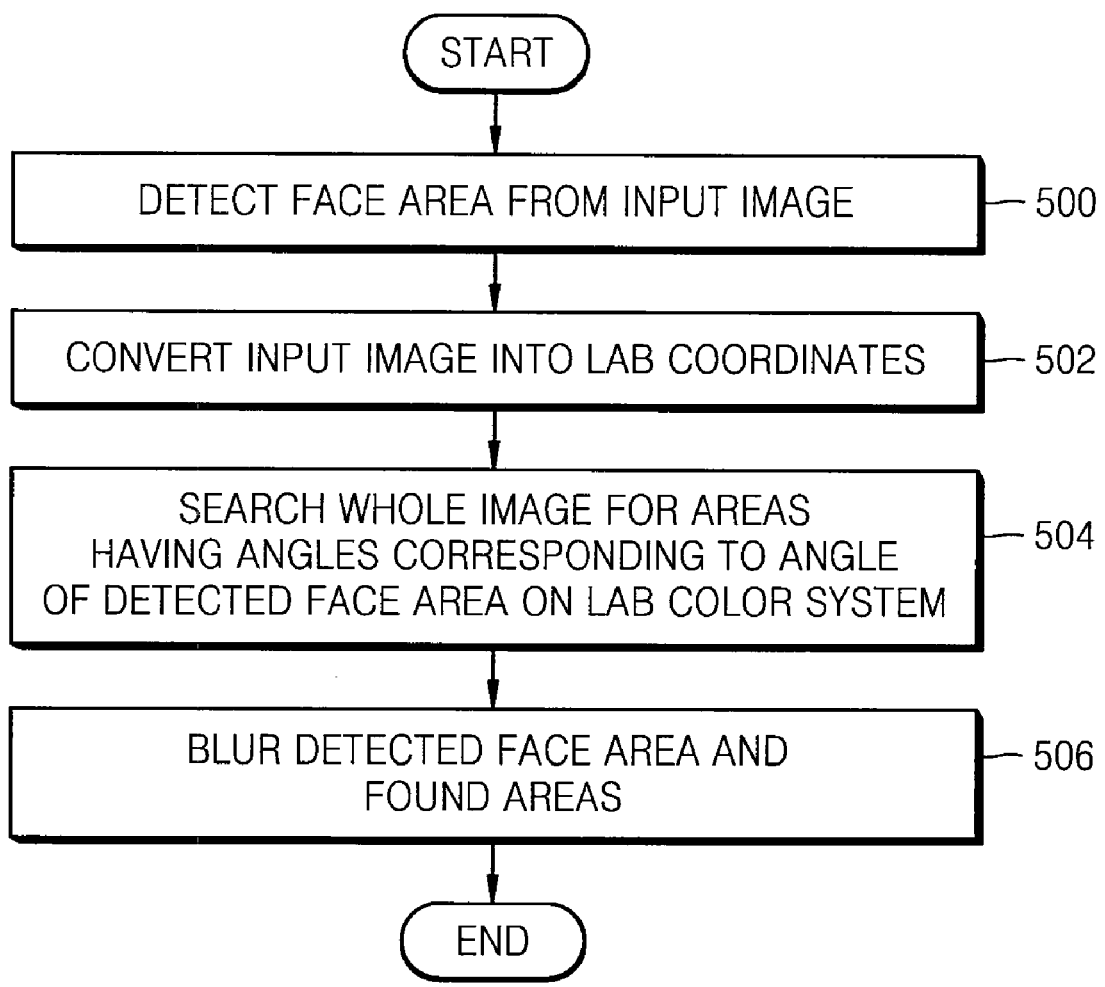

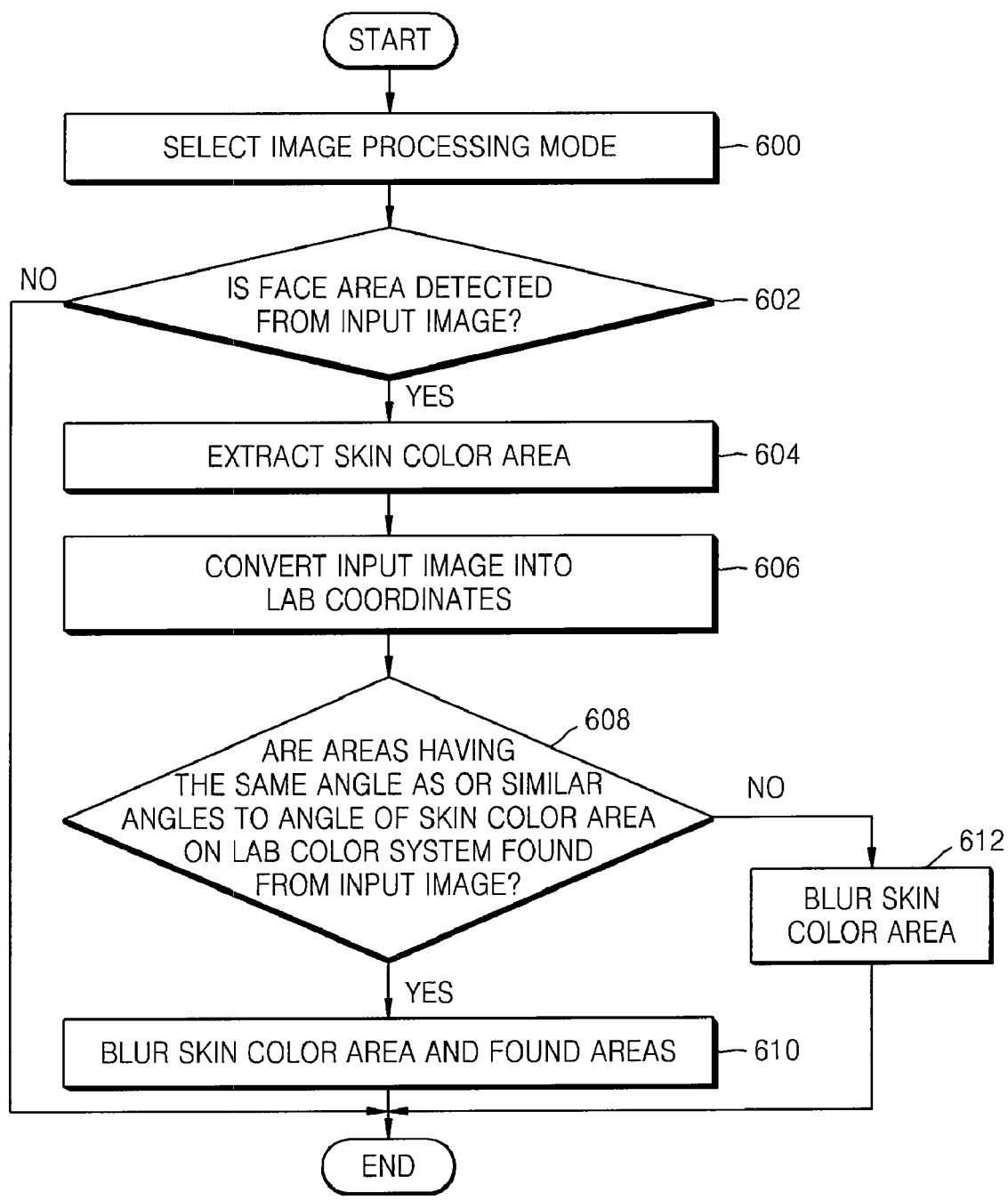

IMAGE PROCESSING METHOD AND APPARATUS, AND DIGITAL PHOTOGRAPHING APPARATUS USING THE SAME

CROSS-REFERENCE TO RELATED PATENT APPLICATION

This application claims the benefit of Korean Patent Application No. 10-2008-0071892, filed on Jul. 23, 2008 in the Korean Intellectual Property Office, the entire contents of which is incorporated herein by reference.

BACKGROUND OF THE INVENTION

1. Field of the Invention

The present invention relates to the field of image processing. More particularly, the present invention relates to an image processing method and apparatus by which, when an image is captured, a face area of the image may be processed to have a soft image quality. The present invention also relates to a digital photographic apparatus using the image processing method and apparatus.

2. Description of the Related Art

Technologies for detecting an object, such as a face, from an image captured by a digital camera and processing the image according to a detection result of the object are being developed more and more in recent times. For example, technologies for adjusting white balance or controlling whether to use a camera flash, in accordance with the brightness of a subject, are being developed more and more.

Meanwhile, users of digital cameras desire their pictures to look more pleasant and brighter. An inconvenience exists to such users with regard to transferring the pictures stored in the digital cameras to personal computers (PCs) and editing the pictures by using image editing programs such as Photoshop.

According to such needs of digital camera users, currently released digital cameras include a functionality to take photographs that look bright. This is a so-called "bright mode" function. When a person is photographed utilizing this "bright mode" function, a generally bright and blurred photograph can be obtained and, particularly, facial skin of the photographed subject appears soft.

However, when utilizing this "bright mode" function, a subject's face can be detected from a captured image and, if the subject's face is detected, the whole image is blurred, thereby reducing the resolution of the whole image. In particular, in such an instance, the whole face is blurred reducing a visibility of the whole face. For example, in such instances, the subject's pupils look unclear, the subject's hair is not naturally expressed, and the subject's accessories situated near the subject's face also look unclear.

SUMMARY OF THE INVENTION

The present invention provides an image processing method and apparatus by which a face area of an image, instead of the whole image, may be processed to be soft in the resulting image. The present invention also provides a digital photographing apparatus using the image processing method and apparatus.

According to an embodiment of the present invention, an image processing method is provided that includes detecting a predetermined face area from an input image; converting the input image into Lab coordinates; determining whether coordinate areas having angles corresponding to an angle of the detected face area exist on a Lab color system and searching the input image for the coordinate areas according to a result of the determining; and blurring the detected face area and the found coordinate areas.

The determining and searching may include determining whether coordinate areas having the same angle as the angle of the detected face area exist on the Lab color system and searching the input image for the coordinate areas having the same angle.

The determining and searching may include determining whether coordinate areas having similar angles to the angle of the detected face area exist on the Lab color system and searching the input image for the coordinate areas having the similar angles.

The face area may be a skin color area.

The image processing method may further include selecting an image processing mode for processing the input image before the detecting.

A degree of the blurring may be selected when the image processing mode is selected.

If at least one face area is detected from the input image, the converting, the determining and searching, and the blurring may be performed.

According to another embodiment of the present invention, an image processing apparatus is provided. The image processing apparatus includes a face area detector detecting a predetermined face area from an input image; a Lab converter converting the input image into Lab coordinates; a controller determining whether coordinate areas having angles corresponding to an angle of the detected face area exist on a Lab color system; an area search unit searching the input image for the coordinate areas according to a result of the determining of the controller; and an image processor blurring the detected face area and the found coordinate areas.

The controller may determine whether coordinate areas having the same angle as the angle of the detected face area exist on the Lab color system.

The area search unit may search the input image for the coordinate areas having the same angle.

The controller may determine whether coordinate areas having similar angles to the angle of the detected face area exist on the Lab color system.

The area search unit may search the input image for the coordinate areas having the similar angles.

The face area may be a skin color area.

The image processing apparatus may further include an image processing mode selector selecting an image processing mode for processing the input image before the detecting.

The image processing mode selector may select a degree of the blurring when the image processing mode is selected.

The face area detector may detect at least one face area from the input image.

According to another embodiment of the present invention, a digital photographing apparatus comprising the image processing apparatus is provided.

According to another embodiment of the present invention, a recording medium having recorded thereon a computer program for executing the image processing method is provided.

BRIEF DESCRIPTION OF THE DRAWINGS

The above and other features and advantages of the present invention will become more apparent by describing in detail exemplary embodiments thereof with reference to the attached drawings in which:

FIG. 5 is a flowchart of an example of an image processing method according to an embodiment of the present invention; and FIG. 6 is a flowchart of an example of an image processing method according to another embodiment of the present invention.

DETAILED DESCRIPTION OF THE INVENTION

Hereinafter, the present invention will be described in detail by explaining embodiments of the invention with reference to the attached drawings. In the following description of the present invention, only essential parts for understanding operation of the present invention will be described and other parts may be omitted in order not to make the subject matter of the present invention unclear.

Also, the terms used in the specification and the claims should not be limited to conventional or lexical meanings and should be construed as having meanings and concepts corresponding to the technical idea of the present invention in order to the most appropriately describe the present invention.

Figure 1:
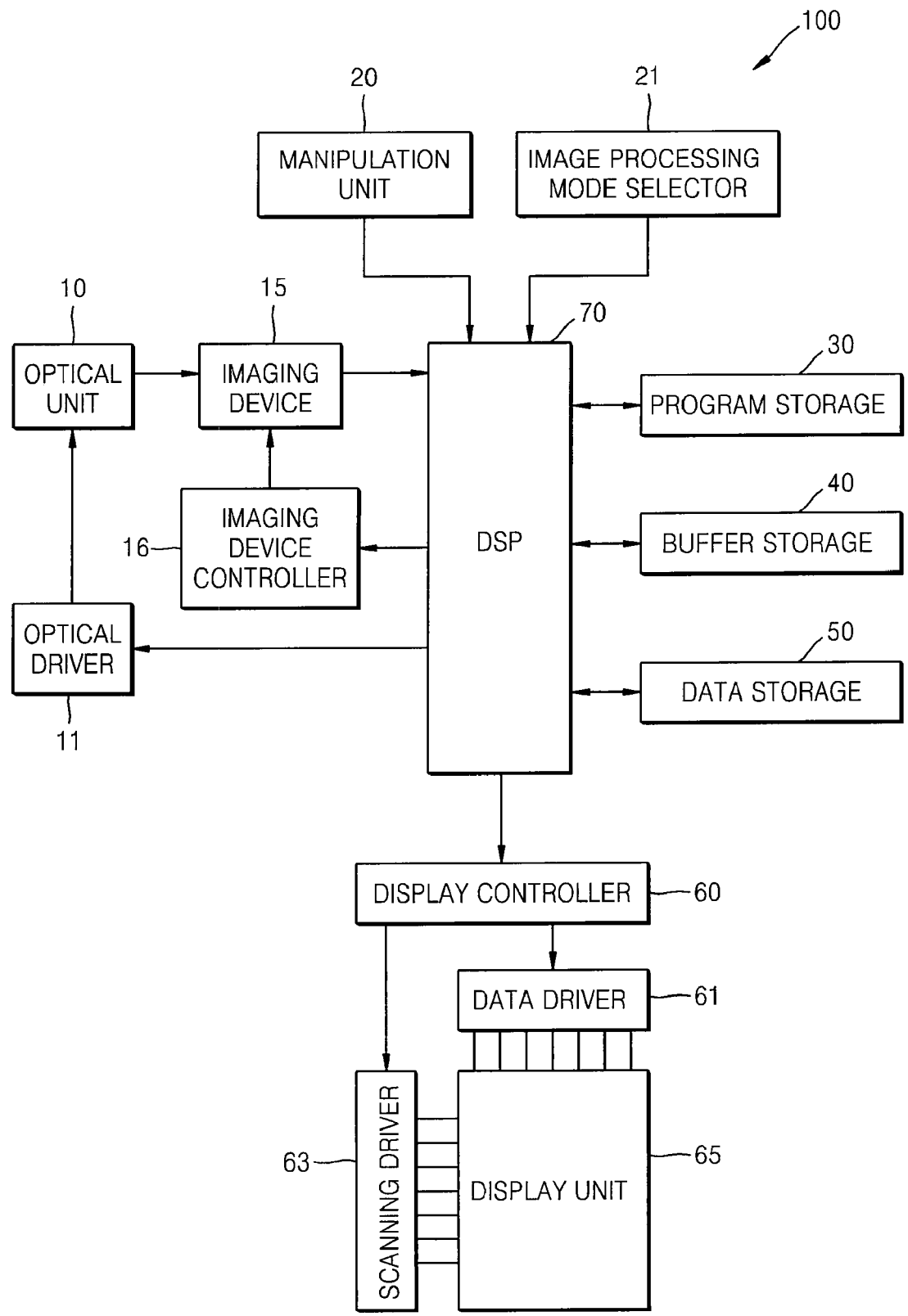
FIG. 1 is a schematic block diagram of an example of a digital photographing apparatus according to an embodiment of the present invention.

FIG. 1 is a schematic block diagram of an example of a digital photographing apparatus 100 according to an embodiment of the present invention.

Referring to the example of FIG. 1, the digital photographing apparatus 100 may be, for example, a digital camera and includes an optical unit 10, an optical driver 11, an imaging device 15, an imaging device controller 16, a manipulation unit 20, an image processing mode selector 21, a program storage 30, a buffer storage 40, a data storage 50, a display controller 60, a data driver 61, a scanning driver 63, a display unit 65, and a digital signal processor (DSP) 70.

The optical unit 10 receives an optical signal corresponding to a subject and provides the optical signal to the imaging device 15. The optical unit 10 may include, for example, one or more lenses, such as a zoom lens that controls a viewing angle to be narrow or wide according to a focal length, and a focus lens that focuses on the subject. Also, the optical unit 10 may include an iris that controls an amount of light.

The optical driver 11 controls positions of the lenses and the opening of the iris. The subject may be brought into focus by moving the positions of the lenses. Also, the amount of light may be controlled by controlling the opening of the iris. The optical driver 11 may control the optical unit 10 according to a control signal that is automatically generated due to a real-time-input image signal or a control signal that is manually input by the user's manipulation.

The optical signal that is passed through the optical unit 10 reaches a light-receiving surface of the imaging device 15 so as to form an image of the subject. The imaging device 15 is a photoelectric conversion device, such as, for example, a charge coupled device (CCD) or a complementary metal oxide semiconductor image sensor (CIS), which converts an optical signal into an electric signal. The imaging device 15 may be controlled by the imaging device controller 16 in that, for example, the speed of the imaging device 15 may be controlled by the imaging device controller 16. The imaging device controller 16 may also control the imaging device 15 according to a control signal that is automatically generated due to a real-time-input image signal or a control signal that is manually input by the user's manipulation.

The manipulation unit 20 may input a control signal from the outside, for example, from the user. The manipulation unit 20 in this example includes various function buttons such as a shutter release button for taking a photograph by exposing the imaging device 15 to light for a predetermined time, a power button for supplying power, wide-angle and telephoto zoom buttons for widening or narrowing the viewing angle according to an input, text input buttons, a mode selection button for selecting a photographing mode or a reproducing mode, and setting buttons for setting white balance and exposure. The manipulation unit 20 may include the various buttons as described above but the present invention is not limited thereto. The manipulation unit 20 may be implemented in any form, for example, such as a keyboard, a touch pad, or a remote controller, through which the user may input signals.

The image processing mode selector 21 receives a user's input to select an image processing mode for processing a captured image. Here, the image processing mode is a mode that expresses the captured image as bright and pretty, or otherwise pleasant to view. According to an embodiment of the present invention, only a detected face area of the captured image is blurred. More particularly, only a skin color area of the face area is blurred. Also, the user may select a degree of the processing, for example, a heavy processing, a medium processing, or a light processing, via the image processing mode selector 21. Thus, the user may select whether to process an image of a person, or more than one person, for example, and a degree of processing. Hereinabove, the image processing mode selector 21 was separately described from the manipulation unit 20. However, the manipulation unit 20 may perform the above-described functions of the image processing mode selector 21, for example.

The digital photographing apparatus 100 includes the program storage 30 which stores programs such as an operating system and an application system, for example, which drive the digital photographing apparatus 100, the buffer storage 40 that temporarily stores necessary data for and result data of operations, and the data storage 50 that stores various types of data necessary for the programs.

Also, the digital photographing apparatus 100 includes the display controller 60 that controls the display of an operation state of the digital photographing apparatus 100 and image data captured by the digital photographing apparatus 100, the data driver 61 and the scanning driver 63 which receive and transfer display data from the display controller 60, and the display unit 65 that displays a predetermined image according to signals input from the data driver 61 and the scanning driver 63. The display unit 65 may be formed, for example, of a liquid crystal display (LCD) panel, an organic light-emitting diode (OLED) panel, or an electrophoretic display (EPD) panel.

In addition, the digital photographing apparatus 100 includes the DSP 70 that processes image signals input to the digital photographing apparatus 100 and controls other elements according to the image signals or external input signals.

The DSP 70 will now be described in detail with reference to FIG. 2.

Figure 2:
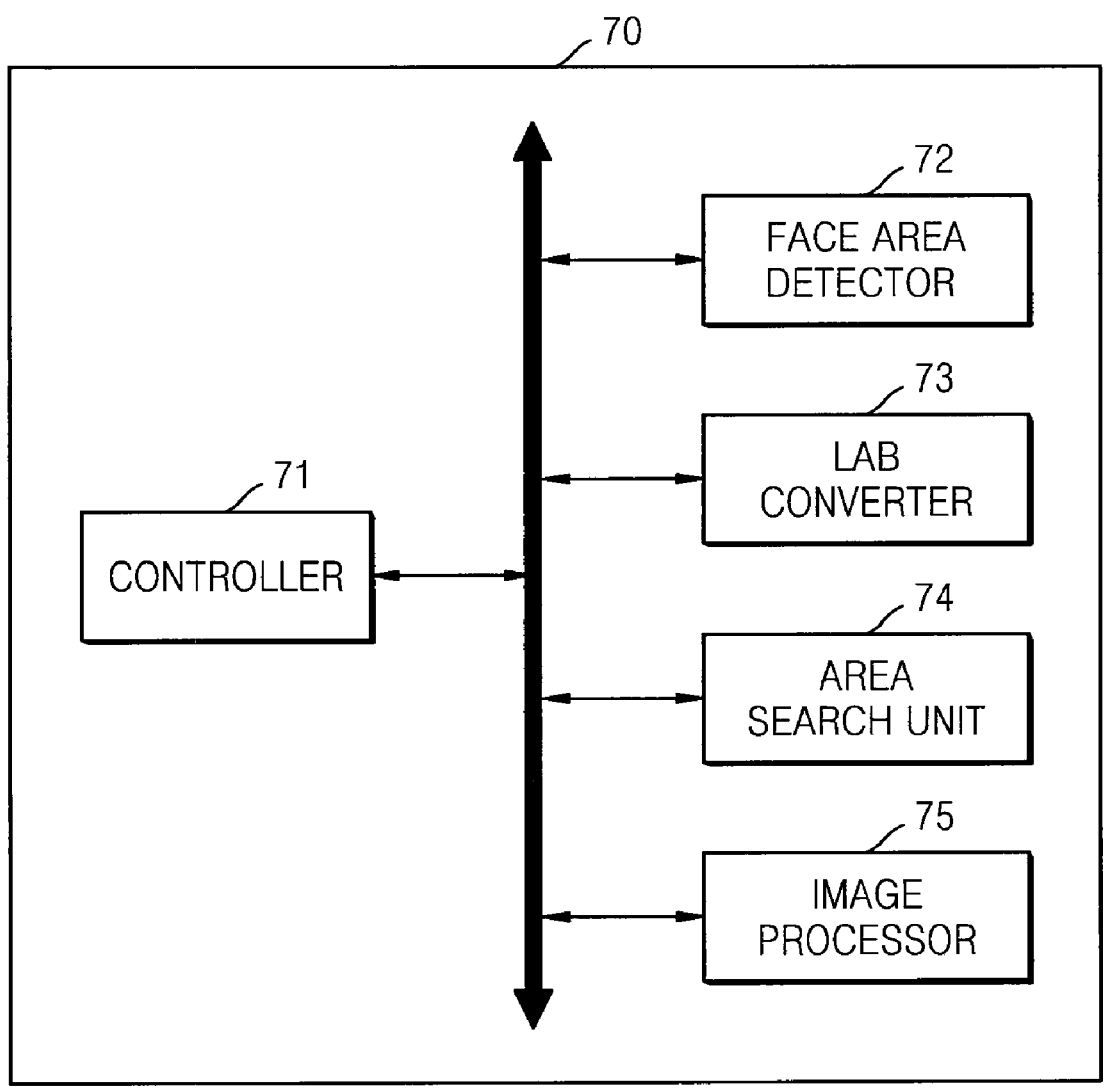
FIG. 2 is a block diagram of an example of a digital signal processor illustrated in FIG. 1.

FIG. 2 is a block diagram of an example of the DSP 70 illustrated in FIG. 1.

Referring to the example of FIG. 2, the DSP 70 includes a controller 71, a face area detector 72, a Lab converter 73, an area search unit 74, and an image processor 75. Here, the DSP 70 and an image processing apparatus used in the claims should be construed as having the same meaning.

The controller 71 controls general operations of the DSP 70.

The face area detector 72 detects a face area from an image input through the imaging device 15 illustrated in FIG. 1. In more detail, the face area detector 72 detects areas having facial characteristics, for example, an area having a skin color, an area having pupils, and an area having a facial shape, as the face area. Preferably, the face area detector 72 may extract only a skin color area from the detected face area.

Many face area detection methods or algorithms exist and may be used to detect the face area according to an embodiment of the present invention. For example, the face area may be detected by using a motion vector method, a characteristic point detection method, and an AdaBoost learning method.

A method of detecting a face area will now be described in detail with reference to FIG. 3.

Figure 3:
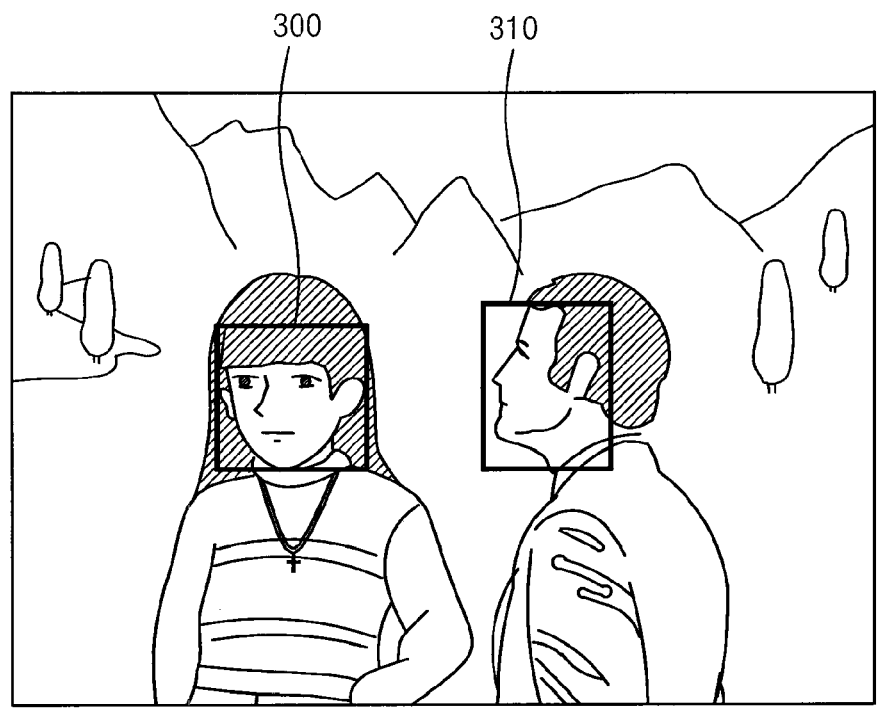
FIG. 3 is a diagram for describing an example of a method of detecting a face area, according to an embodiment of the present invention.

FIG. 3 is a diagram for describing an example of a method of detecting a face area, according to an embodiment of the present invention. FIG. 3 will be described in conjunction with FIG. 2.

FIG. 3 illustrates an image including faces of a woman and a man.

Referring to FIG. 3, the face area detector 72 detects only the woman's face area 300 and the man's face area 310. Here, the woman shows the front of her face and the man shows the side of his face (profile view) as shown in FIG. 3, for example. In general, the front of the face (the woman's face area 300) has a higher detection performance than the side of the face (the man's face area 310) and thus the side of the face (the man's face area 310) may not be detected.

Preferably, the face area detector 72 may detect only a skin color area of the woman's face area 300 and the man's face area 310. According to an embodiment of the present invention, only the skin color area may be detected and blurred.

The Lab converter 73 converts the image input through the imaging device 15 illustrated in FIG. 1, into Lab coordinates. Here, the Lab coordinates are defined by the International Commission on Illumination (CIE) and may almost match a color difference sensible by human eyes to a color difference represented as a value in a color space. The Lab color system of the CIE has a uniform color space and its colors have a very small difference as seen by the eyes. Accordingly, it is now internationally standardized. In the Lab color system, a color coordinate is a three-dimensional (3D) coordinate represented as L*, a*, and b*, where L* represents luminosity, a* represents a degree of red and green, and b* represents a degree of yellow and blue. That is, the Lab color system is similar to a 3D space, having X, Y, and Z coordinates, in mathematics. Also, the Lab color system does not have a completely spherical shape. Green-based color coordinates are close to a center of the Lab color system and red-based color coordinates are much far from the center, in comparison to the green-based color coordinates. L*=100 is white and L*=0 is black. Also, a*=80 looks more reddish than a*=50, and b*=50 looks much more yellowish than b*=20. A color difference in the Lab color system is a 3D distance between two colors in a color space having a shape similar to a sphere. If the two colors have a large 3D distance therebetween, the color difference is large, otherwise, if the color difference is very small, the two colors are regarded as the same color.

The Lab converter 73 converts the input image: an RGB image, into Lab coordinates. A formula for converting an RGB image into Lab coordinates is well known in the art. Thus, the RGB image may be represented by using L*, a*, and b* coordinates.

Figure 4:
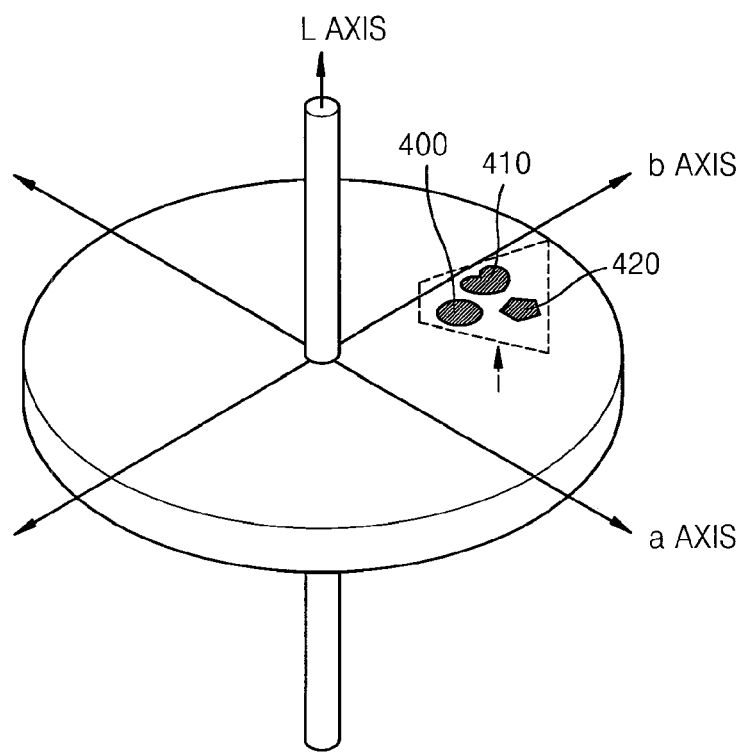
FIG. 4 is a diagram of an example of a Lab color system for describing a method of converting an RGB image into Lab coordinates, according to an embodiment of the present invention.

FIG. 4 is a diagram of an example of a Lab color system for describing a method of converting an RGB image into Lab coordinates, according to an embodiment of the present invention. FIG. 4 will be described in conjunction with FIG. 3.

Referring to FIG. 4, an area 400 is an area on the Lab color system with regard to a face area. More particularly, it is a skin color area that is detected from an input image. Areas 410 and 420 are coordinate areas that are located at similar angles to the area 400. An area marked by a dotted line is a correction area to be blurred. Here, if both the woman's face area 300 and the man's face area 310 are detected, the woman's face area 300, in particular, a skin color area of the woman's face area 300, is Lab-converted into the area 400 and the man's face area 310, in particular, a skin color area of the man's face area 310, is Lab-converted into the area 410. This is because respective skin colors of a woman and a man only have a difference in brightness and tones, that is, a difference on an L axis of the Lab color system, and have the same angle or similar angles between a and b axes (color data, for example). Thus, by utilizing the above-described principal, only a face area, in particular, a skin color area, is blurred.

Also, by blurring only the skin color area, for example, the hair, the pupils, and the accessories included in the woman's face area 300 may not be blurred. Accordingly, the hair, the pupils, and the accessories included in the woman's face area 300 may remain clear.

Furthermore, if only the detected face area is blurred, due to a restrictive face detection performance, a side of the face, for example, the man's face area 310 may not be detected and thus may not be blurred. However, according to an embodiment of the present invention, although only the woman's face area 300, in particular, the skin color area of the woman's face area 300 is detected, if the whole input image is Lab-converted, the man's face area 310 may be found by searching the whole input image for coordinate areas having the same angle or similar angles to an angle of the woman's face area 300. Thus, the man's face area 310 may also be blurred. Here, a determination reference on the similar angles may be arbitrarily set. For example, the determination reference may be set to be ±10°. In this case, image processing may be performed on a detected face area and a coordinate area having the same angle as or ±10° angle difference from an angle of the detected face area on the Lab color system.

Referring back to FIG. 2, the controller 71 controls the Lab converter 73 to convert the input image into Lab coordinates only if the face area, in particular, the skin color area is detected. Also, the controller 71 determines whether coordinate areas, having angles corresponding to, that is, the same angle as or similar angles to an angle of the face area detected by the face area detector 72, exist on a Lab color system.

The area search unit 74 searches the whole input image for the coordinate areas on the Lab color system, according to a determination result of the controller 71. Accordingly, only a face area may be blurred. Also, a face area that is not detected due to a restrictive face detection performance may also be blurred.

The image processor 75 blurs the face area detected by the face area detector 72 and the coordinate areas found by the area search unit 74. According to an embodiment of the present invention, blurring is a process for softening and brightening a certain image by removing details of the image. Here, the blurring is performed by applying a filter, such as low-pass filter (LPF) or a Gaussian blur filter that equalizes pixel values, to the image. Also, if the area search unit 74 could not find the coordinate areas having the same angle as or similar angles to the angle of the detected face area on the Lab color system, from the whole input image, the image processor 75 blurs only the detected face area.

In general, the image processor 75 converts an image signal, input from the imaging device 15 illustrated in FIG. 1, into a digital image signal and performs image signal processes, such as, for example, gamma correction, color filter array interpolation, color matrix, color correction, and color enhancement, on the digital image signal in order to convert the digital image signal to be suitable for human vision.

Also, the image processor 75 may perform an auto white valance algorithm or an auto exposure algorithm if an auto white valance function or an auto exposure function is set. Furthermore, the image processor 75 controls a size of image data by using a scaler and generates an image file in a predetermined format by compressing the image data. On the other hand, the image processor 75 may decompress the image file. The image processor 75 may perform the above-described image signal processes on an image signal that is input in real time in a live-view mode before photographing, or an image that is input due to a shutter-release signal. In this case, different image signal processes may be performed on different image signals.

FIG. 5 is a flowchart of an example of an image processing method according to an embodiment of the present invention.

Referring to the example of FIG. 5, a face area is detected from an input image, in operation 500. Preferably, a skin color area is particularly extracted from the detected face area. The input image is converted into Lab coordinates, in operation 502. Then, the whole input image is searched for coordinate areas having angles corresponding to an angle of the detected face area on a Lab color system, in operation 504. Finally, the detected face area and the found coordinate areas are blurred, in operation 506.

FIG. 6 is a flowchart of an example of an image processing method according to another embodiment of the present invention.

Referring to the example of FIG. 6, an image processing mode is selected, in operation 600. Here, image processing is blurring that softens and brightens an original image. It is determined whether a face area is detected from an input image, in operating 602. If it is determined that the face area is not detected, in operation 602, the method terminates. Otherwise, if it is determined that the face area is detected, in operation 602, a skin color area is extracted from the detected face area, in operation 604. Operation 604 is performed because, if the whole detected face area is blurred, the hair, the pupils, and accessories (such as ear-rings and a necklace) which are included in the detected face area are also blurred, which is undesirable to a user.

The input image is converted into Lab coordinates, in operation 606. Subsequently, the input image is searched for coordinate areas having the same angle as or similar angles to an angle of the skin color area on a Lab color system, in operation 608. Thus, the whole input image is searched for skin color areas and only the skin color areas are blurred, and thus clean, bright, and pretty skin may be expressed on the input image.

If the coordinate areas having the same angle as or similar angles to an angle of the skin color area on a Lab color system are found, in operation 608, the method proceeds to operation 610. Then, the extracted skin color area and the found coordinate areas are blurred, in operation 610.

Otherwise, if the coordinate areas having the same angle as or similar angles to an angle of the skin color area on a Lab color system are not found, in operation 608, the method proceeds to operation 612 in which only the skin color area extracted in operation 604 is blurred.

Although the above embodiments of the present invention are described based on a digital camera as an example of a digital photographing apparatus, the present invention is not limited thereto. It will be understood by those having ordinary skill in the art that the present invention may be applied to mobile camera phones having camera functions, personal digital assistants (PDAs), and portable multimedia players (PMPs), for example.

Also, the invention can also be embodied as computer readable codes on a computer readable recording medium. The computer readable recording medium is any data storage device that can store data that can be thereafter read by a computer system. Examples of the computer readable recording medium include a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, reduction of the resolution of a whole image may be prevented by processing only a face area, instead of the whole image, to have a soft image quality. In particular, deterioration in quality of portions which are not supposed to be blurred, may be prevented by blurring only a skin color area of the face area.

Also, if a plurality of face areas exist, although a certain face area is not detected from an input image, face areas having the same as or similar colors to a color of a detected face area may be detected on a color system. Thus, a problem of restrictive face detection may be solved and image quality improvement may be achieved on every type of facial image.

While the present invention has been particularly shown and described with reference to exemplary embodiments thereof, it will be understood by those having ordinary skill in the art that various changes in form and details may be made therein without departing from the spirit and scope of the invention as defined by the following claims. The exemplary embodiments should be considered in descriptive sense only and not for purposes of limitation. Therefore, the scope of the invention is defined not by the detailed description of the invention but by the following claims, and all differences within the scope will be construed as being included in the present invention.

What is claimed is:

1. An image processing method comprising:
   detecting a predetermined face area from an input image;
   converting the input image into Lab coordinates;
   determining whether coordinate areas having angles corresponding to an angle of the detected face area exist on a Lab color system and searching the input image for the coordinate areas according to a result of the determining; and
   blurring the detected face area and the found coordinate areas.

2. The image processing method of claim 1, wherein the determining and searching comprises determining whether coordinate areas having the same angle as the angle of the detected face area exist on the Lab color system and searching the input image for the coordinate areas having the same angle.

3. The image processing method of claim 2, wherein the determining and searching comprises determining whether coordinate areas having similar angles to the angle of the detected face area exist on the Lab color system and searching the input image for the coordinate areas having the similar angles.

4. The image processing method of claim 3, wherein the face area is a skin color area.

5. The image processing method of claim 3, further comprising selecting an image processing mode for processing the input image before the detecting.

6. The image processing method of claim 5, wherein a degree of the blurring is selected when the image processing mode is selected.

7. The image processing method of claim 1, wherein, if at least one face area is detected from the input image, the converting, the determining and searching, and the blurring are performed.

8. A non-transitory recording medium having recorded thereon a computer program for executing the image processing method of claim 1.

9. An image processing apparatus comprising:
a face area detector detecting a predetermined face area from an input image;
a Lab converter converting the input image into Lab coordinates;
a controller determining whether coordinate areas having angles corresponding to an angle of the detected face area exist on a Lab color system;
an area search unit searching the input image for the coordinate areas according to a result of the determining of the controller; and
an image processor blurring the detected face area and the found coordinate areas.

10. The image processing apparatus of claim 9, wherein the controller determines whether coordinate areas having the same angle as the angle of the detected face area exist on the Lab color system, and
wherein the area search unit searches the input image for the coordinate areas having the same angle.

11. The image processing apparatus of claim 10, wherein the controller determines whether coordinate areas having similar angles to the angle of the detected face area exist on the Lab color system, and
wherein the area search unit searches the input image for the coordinate areas having the similar angles.

12. The image processing apparatus of claim 11, wherein the face area is a skin color area.

13. The image processing apparatus of claim 12, further comprising an image processing mode selector selecting an image processing mode for processing the input image before the detecting.

14. The image processing apparatus of claim 13, wherein the image processing mode selector selects a degree of the blurring when the image processing mode is selected.

15. The image processing apparatus of claim 9, wherein the face area detector detects at least one face area from the input image.

16. A digital photographing apparatus comprising the image processing apparatus of claim 9.

* * * * *